(12) United States Patent
Bershad et al.

(10) Patent No.: US 6,909,782 B2
(45) Date of Patent: Jun. 21, 2005

(54) FAST CONVERGING AFFINE PROJECTION BASED ECHO CANCELLER FOR SPARSE MULTI-PATH CHANNELS

(75) Inventors: Neil Bershad, Newport Beach, CA (US); Anurag Bist, Irvine, CA (US); Stan Hsieh, Diamond Bar, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 09/947,887

(22) Filed: Sep. 6, 2001

(65) Prior Publication Data

US 2002/0093919 A1 Jul. 18, 2002

Related U.S. Application Data

(60) Provisional application No. 60/231,419, filed on Sep. 8, 2000.

(51) Int. Cl.$^7$ .......................... H04M 1/00; H04M 9/00; H04M 9/08
(52) U.S. Cl. ........................... 379/406.08; 379/406.01; 379/406.06
(58) Field of Search ..................... 379/406.01–406.16; 375/285, 296; 381/71.1–71.14; 708/300–323

(56) References Cited

U.S. PATENT DOCUMENTS

| | | | |
|---|---|---|---|
| 6,137,881 A | 10/2000 | Oh et al. | |
| 6,198,819 B1 | * 3/2001 | Farrell et al. .......... | 379/406.08 |
| 6,201,866 B1 | 3/2001 | Ariyama et al. | |
| 6,246,760 B1 | 6/2001 | Makino et al. | |

OTHER PUBLICATIONS

Sundar G. Sankaran, A.A. (louis) Beex, 'Convergence Analysis Results For the Class of Affine Projection Algorithms', May 1999, IEEE International Symposium on Circuits and Systems, vol. III, pp. 251–254.*

Shigeji Ikeda and Akihiko Sugiyama, 'A Fast Convergance Algorithm for Sparse–Tap Adaptive FIR filters for an unknown Number of Multiple Echoes', 1994, IEEE,pp. III–41 to III–44.*

Technical Memorandum #1, Dr. Neil Bershad, Jun. 12, 2000.

An Adaptive Filtering Algorithm Using an Orthogonal Projection to an Affine Subspace and its Properties, by Kazuhiko Ozeki et al., NHK Technical Research Laboratories, Tokyo, Japan, 1984, pp. 19–27.

Underdetermined Growing and Sliding Window Covariance Fast Transversal Filter RLS Algorithms, by Dirk Slock, Signal Processing VI: Theories and Applications, Valbonne, France, 1992, pp. 1169–1172.

Convergance Analysis Results for the Class of Affine Projection Algorithms, Sundar G. Sankaran et al., Systems Group–DSP Research Laboratory, Blacksburg, VA, 1999 IEEE, pp. III–251—III–254.

On a Class of Computationally Efficient, Rapidly Converging, Generalized NLMS Algorithms, by Dennis R. Morgan et al., IEEE Signal Processing Letters, vol. 3, No. 8, Aug. 1996, pp. 245–247.

(Continued)

Primary Examiner—Curtis Kuntz
Assistant Examiner—Alexander Jamal
(74) Attorney, Agent, or Firm—Alan Pedersen-Giles

(57) ABSTRACT

A first adaptive filter having a first filter length estimates a channel weight vector of an echo channel using an affine projection (AP) update. The echo channel receives a send input sequence and a receive input sequence. The echo channel has a plurality of sparse multi-path channels. A delay estimator determines a plurality of delays in the echo channel using the estimated channel weight vector. A second adaptive filter estimates a plurality of short weight vectors using the AP update and the plurality of delays. The short weight vectors correspond to the sparse multi-path channels. Each of the short weight vectors has a short filter length.

36 Claims, 16 Drawing Sheets

OTHER PUBLICATIONS

Fast Generalized Affine Projection Algorithm, by Sundar G. Sankaran et al., International Journal of Adaptive Control and Signal Processing, 2000, pp. 623–641.

A Stochastic Analysis of the Affine Projection Algorithm for Gaussian Autoregressive Inputs, by N. Bershad et al, ICASSP, 2001.

A Simplified Stochastick Analysis of the Affine Projection Algorithm for Gaussian Autoregressive Inputs, by N. Bershad, Nov. 2000, pp. 1–18.

\* cited by examiner

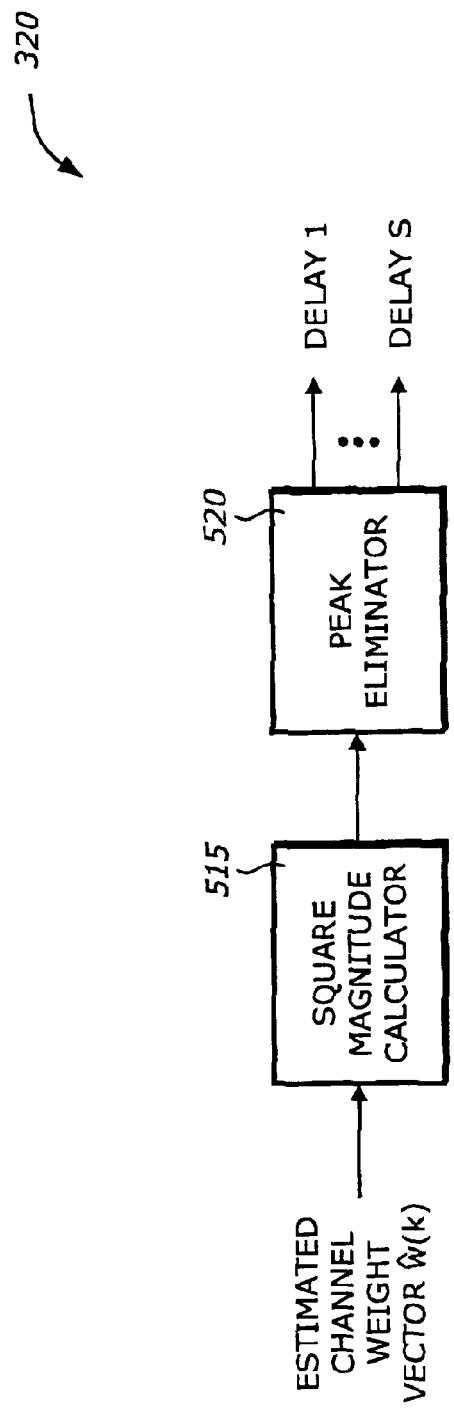

FAST CONVERGING AFFINE PROJECTION BASED ECHO CANCELLER FOR SPARSE MULTI-PATH CHANNELS

RELATED APPLICATION

This application claims the benefit of U.S. Provisional Patent Application Ser. No. 60/231,419 filed on Sep. 8, 2000.

This application is related to U.S. patent application Ser. No. 09/947,804 filed on Sep. 6, 2001, entitled Method And Apparatus For A Fast Converging Affine Projection Based Echo Canceller," and assigned to the same assignee of the present application.

BACKGROUND

1. Field

This invention relates to signal processing. In particular, the invention relates to echo cancellation.

2. Description of Related Art

Echo is generally undesirable in telephony. Echo is caused by a number of sources. These include multiple reflections of the signal from the loudspeaker back to the microphone, direct acoustic coupling between the loudspeaker and the telephone, and ambient noise. Echo cancellation is a technique to reduce the undesirable effects of the echo. The echo canceller estimates the impulse response of the echo path and generates an estimate of the echo. The estimated echo is then subtracted from the near-end signal. Typically, an adaptive filter is used to estimate the echo because the echo path is usually unknown and randomly time-varying.

An existing technique for echo cancellation is the normalized least mean squares (NLMS) method. This method attempts to minimize the expected value of the squared error. However, the NLMS method has a number of disadvantages. One significant disadvantage is its slow convergence rate for color inputs. Furthermore, when the echo channel has sparse multi-path channels, the NLMS method may not provide proper results.

Therefore, there is a need to have an efficient technique to perform echo cancellation having a convergence rate faster than the NLMS method in sparse multi-path channels.

BRIEF DESCRIPTION OF THE DRAWINGS

The features and advantages of the invention will become apparent from the following detailed description of the invention in which:

FIG. 5 is a diagram illustrating a delay estimator for the AP-based echo canceller shown in FIG. 2 according to one embodiment of the invention.

DESCRIPTION

In the following description, for purposes of explanation, numerous details are set forth in order to provide a thorough understanding of the present invention. However, some of these specific details may not be required in order to practice the invention. In other instances, well-known electrical structures and circuits are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A "code segment" may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
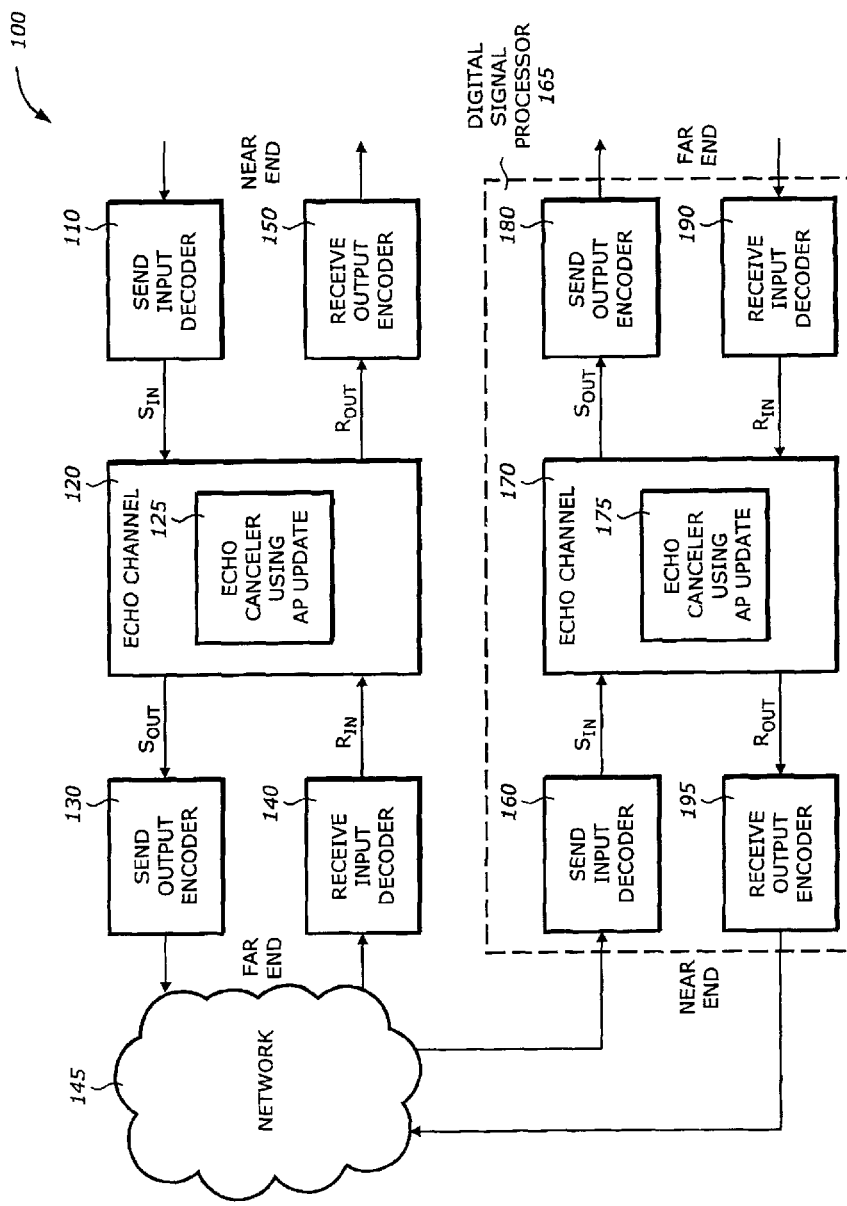
FIG. 1 is a diagram illustrating a system in which one embodiment of the invention can be practiced.

FIG. 1 is a diagram illustrating a system 100 in which one embodiment of the invention can be practiced. The system 100 includes a send input decoder 110, an echo channel 120, a send output decoder 130, a receive input decoder 140, a receive output encoder 150, a network 145, a send input decoder 160, an echo channel 170, a send output decoder 180, a receive input decoder 190, and a receive output encoder 195.

The send input decoder 110 receives the encoded speech from a first near end and decodes the encoded speech into linear speech data Sin. In one embodiment, the send input decoder 110 is a $\mu$-Law/A-Law decoder. The echo channel 120 includes an echo canceller using affine projection (AP) 125. The AP-based echo canceller 125 removes an echo estimated signal from the linear data samples Sin to generate linear data samples Sout. The send output encoder 130 provides speech compression before packetizing. In one embodiment, the send output encoder 130 is a G.7xx encoder which compresses the speech data Sout from the echo channel 120 using any one of the compression standards for low-bit rate voice (LBRV) including the International Telecommunication Union (ITU)-T internationally standardized G.7xx series. The compressed speech data are sent to the far end via a network. The receive input decoder 140 de-compresses the speech data received from the first far end over the network 145. The de-compression technique is compatible with the compression used in the send output encoder 130. The echo channel 120 receives the Rin from the receive input decoder 140 and sends out the Rout linear data samples. The receive output encoder 150 encodes the linear data samples Rout into $\mu$-Law and A-law encoded speech to be sent out to the first near end.

The network 145 is any network having capability to transmit packetized data from and to the send output decoder 130, the send input decoder 160, the receive input decoder 140, and the receive output decoder 195. The network 145 may be the Internet, an intranet, an extranet, a local area network (LAN), or a wide area network (WAN). The send input decoder 160 receives the encoded speech from the network 145 and decodes the encoded speech into linear speech data Sin. In one embodiment, the send input decoder 160 is a $\mu$-Law/A-Law decoder. The echo channel 170 includes an echo canceller using affine projection (AP) 175. The AP-based echo canceller 175 removes an echo estimated signal from the linear data samples Sin to generate linear data samples Sout. The send output encoder 180 provides speech compression before packetizing. In one embodiment, the send output encoder 180 is a G.7xx encoder which compresses the speech data Sout from the echo channel 170 using any one of the compression standards for low-bit rate voice (LBRV) including the International Telecommunication Union (ITU)-T internationally standardized G.7xx series. The compressed speech data are sent to a receiving device at the second far end. The receive input decoder 190 de-compresses the speech data received from the second far end. The de-compression technique is compatible with the compression used in the send output encoder 180. The echo channel 170 receives the Rin from the receive input decoder 190 and sends out the Rout linear data samples. The receive output encoder 190 encodes the linear data samples Rout into $\mu$-Law and A-law encoded speech to be sent out to the second near end to the network 145. In one embodiment, the send input decoder 160, the echo channel 170, the send output decoder 180, the receive input decoder 190, and the receive output encoder 195 are integrated into a digital signal processor 165.

Figure 2:
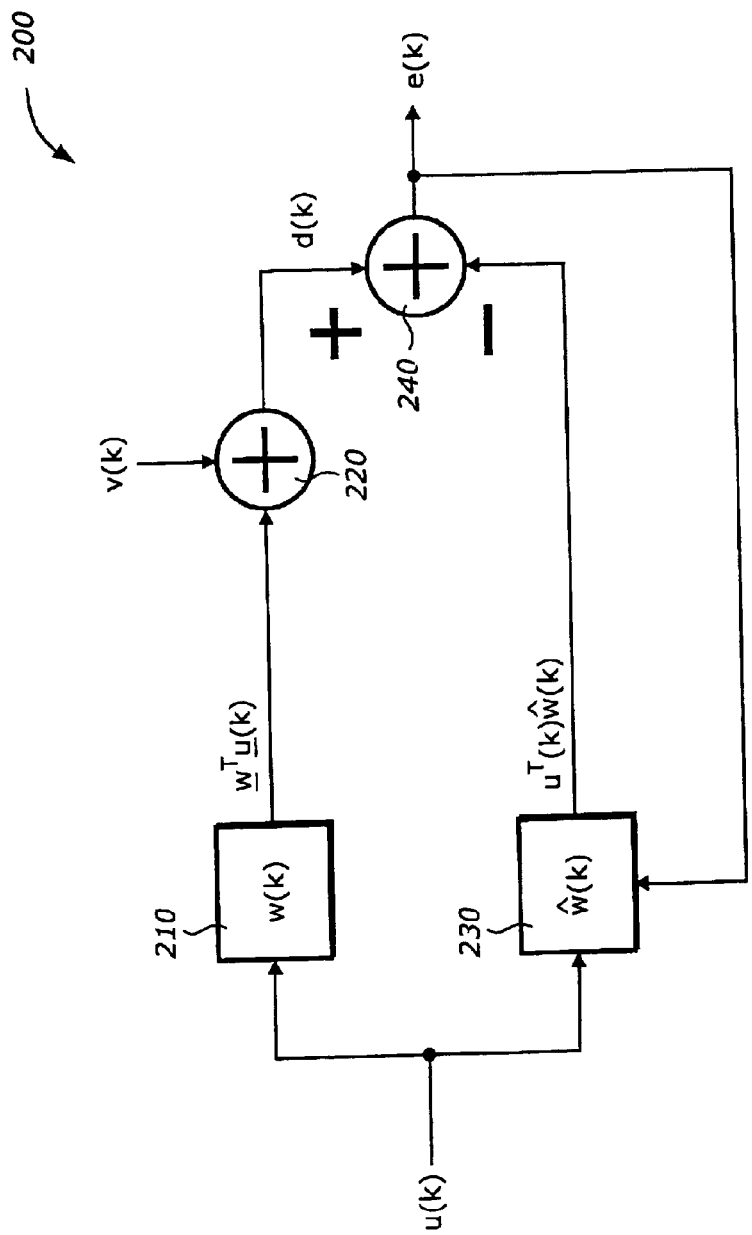
FIG. 2 is a diagram illustrating a system model for the AP-based echo canceller shown in FIG. 1 according to one embodiment of the invention.

FIG. 2 is a diagram illustrating a system model for the AP-based echo canceller 125 shown in FIG. 1 according to one embodiment of the invention. The system model 200 includes a plant 210, an adder 220, an adaptive filter 230, and a subtractor 240.

The system model 200 models an echo cancellation process. The echo cancellation process can be modeled as a system identification problem where an unknown linear system is to be identified. The input to the system is an input sequence u(k). The plant 210 characterizes the system behavior. The plant 210 can be modeled as a finite impulse response (FIR) filter having weight vector W=[$w_1, w_2, \ldots, w_N$]. The plant output is given by:

$$y(k) = W^T u(k) \quad (1)$$

where $W^T$ is the transpose of the weight vector W. The weight vector W is unknown.

The adder 220 adds a random noise sequence v(k) to the plant output y(k) to produce the desired output d(k). The adaptive filter 230 is modeled as a FIR filter having the weight vector $\hat{W}$=[$w_1, w_2, \ldots, w_N$]. The subtractor 240 subtracts the desired output d(k) from the output of the adaptive filter to produce an error e(k). The error e(k) is used to adjust or update the weight vector $\hat{W}$ such that the error e(k) is minimized under some objective function (e.g., least mean square). The weight vector $\hat{W}$ is updated such that it approaches the weight vector W. The weight vector $\hat{W}$, therefore, represents an estimate of the weight vector W.

Figure 3:
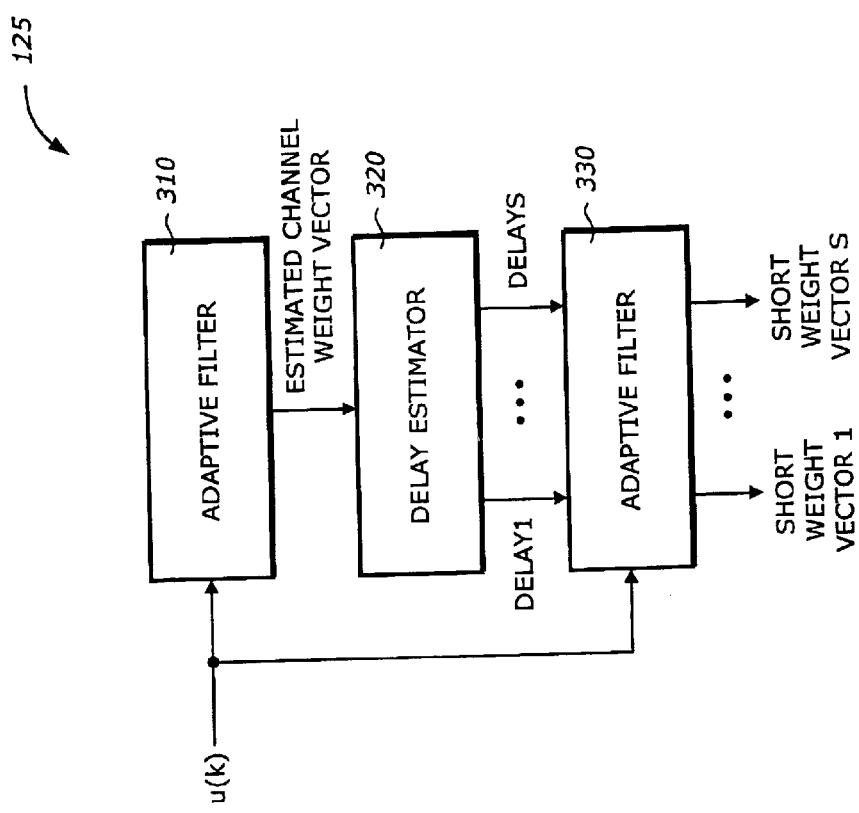
FIG. 3 is a diagram illustrating an AP-based echo canceller shown in FIG. 1 according to one embodiment of the invention.

FIG. 3 is a diagram illustrating the AP-based echo canceller 125 shown in FIG. 1 according to one embodiment of the invention. The echo canceller 125 includes an adaptive filter 310 and a delay estimator 320.

The adaptive filter 310 estimates a channel weight vector $\hat{W}$ of the echo channel 120 (FIG. 1) using an affine projection (AP) update. As described in FIG. 1, the echo channel 120 receives a send input sequence Sin and a receive input sequence Rin. The adaptive filter 310 is used to calculate the delays by the delay estimator 320. The channel weight vector $\hat{W}$ has a first length M1. In one embodiment, the first length M1 is 1024.

The delay estimator 320 determines the bulk delay in the echo channel 120 using the estimated channel weight vector $\hat{W}$ provided by the adaptive filter 310. The delay estimator 320 provides the estimated delays to the adaptive filter 330.

The adaptive filter 330 estimates a number of short weight vectors using the AP update and the estimated delays from the delay estimator 320. The short weight vectors correspond to the impulse responses of the sparse multi-path channels. Each of the short weight vectors has a length typically shorter than the first length M1.

The adaptive filters 310 and 330 use an AP update rule to estimate the channel weight vector. The AP method is used to accelerate the convergence of the normalized least mean square (NLMS) technique, especially for colored inputs. The AP updates the weights on the basis of multiple past input vectors, while the NLMS updates the weights on the basis of the most recent input vector. The AP update rule is described in the following.

The input sequence u(k) can be modeled as an auto-regressive process of order P, denoted as AR(P):

$$u(k) = \sum_{i=1}^{P} a_i * u(k-i) + z(k) \qquad (2)$$

where z(k) is white sequence with unit variance.

Assuming P is known a priori, samples of u(k) can be written as an (M×1) column vector u(k), or:

$$u^T(k)=[u(k), u(k-1), \ldots, u(k-M+1)] \qquad (3)$$

The AR(P) process can then be written as:

$$\begin{aligned}u(k) &= \sum_{i=1}^{P} a_i * u(k-i) + z(k) \\ &= U(k)*a + z(k)\end{aligned} \qquad (4)$$

where U(k) is a collection of P of past vectors:

$$U(k)=[u(k-1), u(k-2), \ldots, u(k-P)] \qquad (5)$$

and z(k) is an (M×1) column vector of samples of a white random sequence:

$$z^T(k)=[z(k), z(k-1), \ldots, z(k-M+1)] \qquad (6)$$

The least squares estimate of the parameters of a is given by $$\hat{a}(k)=[U^T(k)*U(k)]^{-1}*U^T(k)*u(k) \qquad (7)$$

where $U^T(k)*U(k)$ is assumed of rank P and * denotes multiplication.

The AP recursive update rule for $\mu=1$ is defined by the following set of operations:

$$\begin{aligned}\phi(k) &= u(k) - U(k)*\hat{a}(k) \\ &= \{I - U(k)*[U^T(k)*U(k)]^{-1}*U^T(k)\}*u(k)\end{aligned} \qquad (8)$$

$$e(k)=d(k)-u^T(k)*\hat{W}(k) \qquad (9)$$

$$\hat{W}(k+1)=\hat{W}(k)+[\phi(k)/(\phi^T(k)*\phi(k))]*e(k) \qquad (10)$$

where $\hat{W}(k)$ is the channel weight vector estimated by the adaptive filter 310 or the individual short weight vector estimated by the adaptive filter 330.

It has been shown that if u(k) is an AR process of order P, â(k) is a least squares estimate of its AR coefficients and $\phi(k) \cong z(k)$. In other words, $\phi(k)$ is a vector whose elements are estimates of a white random sequence.

Figure 4A:
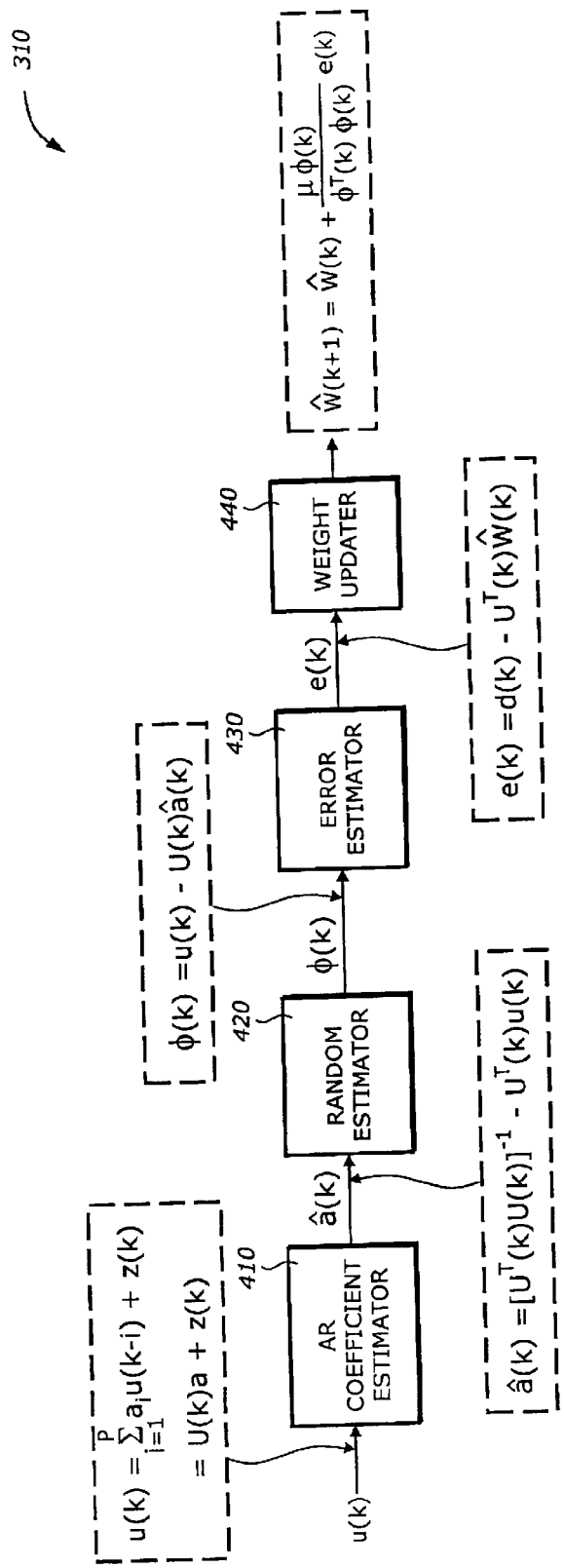
FIG. 4A is a diagram illustrating an adaptive filter for the AP-based echo canceller shown in FIG. 3 according to one embodiment of the invention.

FIG. 4A is a diagram illustrating the adaptive filter 310 for the AP-based echo canceller shown in FIG. 3 according to one embodiment of the invention. The AP-based adaptive filter 310 includes an auto-regressive (AR) coefficient estimator 410, a random estimator 420, an error estimator 430, and a weight updater 440.

The AR coefficient estimator 410 estimates the AR coefficient vector a(k) at a first update rate using the past receive input sequence and the present receive sequence. The AR coefficient estimator 410 generates the AR coefficient vector â(k) using equation (7).

The random estimator 420 estimates the random sequence $\phi(k)$ at a second update rate using the estimated AR coefficient vector. The random estimator 420 determines the random sequence $\phi(k)$ using equation (8).

The error estimator 430 estimates an error at the second update rate using the send sequence, the receive sequence, and the estimated channel weight vector. The error estimator 430 computes the error e(k) using equation (9).

The weight updater 440 updates the channel weight vector W at the second update rate using the estimated error and the estimated random sequence. The weight updater 440 updates the channel weight $\hat{W}$ using equation (10).

The first and second update rates may be the same or different. In one embodiment, the first update rate is slower than the second update rate. The second update rate is the rate at every iteration of the update loop. The first update rate is the rate at every K iterations where K is a positive integer. In one embodiment, K is equal to 100. In other words, the AR coefficient estimator 410 generates a new result at every K iterations while the random estimator 420, the error estimator 430 and the weight updater 440 generates new results at every iteration.

Figure 4B:
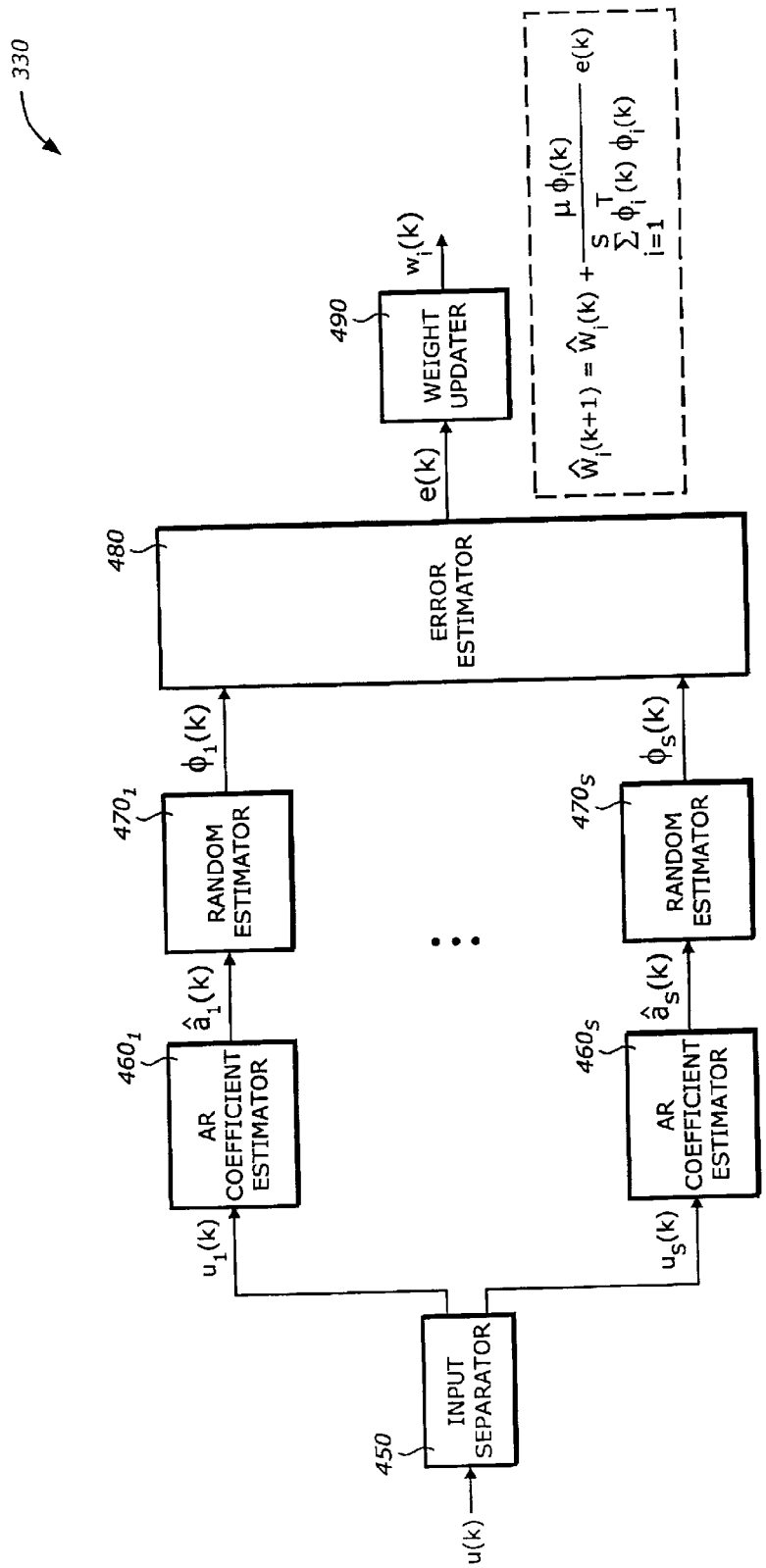
FIG. 4B is a diagram illustrating the adaptive filter for the AP-based echo canceller shown in FIG. 3 according to one embodiment of the invention.

FIG. 4B is a diagram illustrating the adaptive filter 330 for the AP-based echo canceller shown in FIG. 3 according to one embodiment of the invention. The adaptive filter 330 includes an input separator 450, S partial AR coefficient estimators $460_1$ to $460_S$, S partial random estimators $470_1$ to $470_S$, an error estimator 480, and a weight updater 490.

The input separator 450 separates the receive input sequence u(k) into S partial input sequences. Each of the partial input sequences is delayed by a corresponding delay from the delays provided by the delay estimator 320 (FIG. 3) and is represented by a sum of a partial random sequence and a past partial input sequence weighted by a partial AR coefficient vector as follows:

$$u_i(k)=U_i(k)*a_i+z_i(k), i=1\ldots, S \qquad (11)$$

The S partial AR coefficient estimators $460_1$ to $460_S$ are coupled to the input separator 450 to receive the S partial input sequences $u_{i(k)}$, where $i=1, \ldots, S$. Each of the partial AR coefficient estimators $460_1$ to $460_S$ estimates the partial AR coefficient vector at a first update rate using the past partial input sequence and the partial input sequence:

$$\hat{a}_i(k)=[U_i^T(k)*U_i(k)]^{-1}*U_i^T(k)*u_i(k), i=1, \ldots S \qquad (12)$$

The S partial random estimators $470_1$ to $470_S$ are coupled to the partial AR coefficient estimators $460_1$ to $460_S$, respectively. Each of the partial random estimators $470_1$ to $470_S$ estimates the partial random sequence at a second update rate using the estimated partial AR coefficient vector:

$$\phi_i(k)=u_i(k)-U_1(k)*\hat{a}_1(k), i=1, \ldots, S \qquad (13)$$

The error estimator 480 estimates an error at the second update rate using the send input sequence Sin or d(k), the partial input sequences, and the estimated short weight vectors:

$$e(k)=d(k)-\Sigma u_i W_i^T, i=1, \ldots, S \qquad (14)$$

The weight updater 490 updates the short weight vectors $W_i(k)$ at the second update rate using the estimated error and the estimated partial random sequences:

$$w_i(k+1)=w_i(k)+[\phi_i(k)/\phi_i^T(k)*\phi_i(k))]*e(k), I=1, \ldots, S \qquad (15)$$

The first and second update rates may be the same or different. In one embodiment, the first update rate is slower than the second update rate. The second update rate is the rate at every iteration of the update loop. The first update rate is the rate at every K iterations where K is a positive integer. In one embodiment, K is equal to 100. In other words, the S partial AR coefficient estimators $460_1$ to $460_S$ generate new results at every K iterations while the S partial random estimators $460_1$ to $460_S$, the error estimator 480 and the weight updater 490 generate new results at every iteration.

FIG. 5 is a diagram illustrating the delay estimator 320 for the AP-based echo canceller shown in FIG. 2 according to one embodiment of the invention. The delay estimator 320 includes a peak locator 510 and a peak eliminator 520.

The delay estimator 320 estimates the bulk delays in the echo channel 120 (FIG. 1) from the estimated channel weight vector W(k). The estimated delays provided by the delay estimator 320 are used by the adaptive filter 330 (FIG. 3) for the adaptation. The delay estimator 320 essentially locates a number of peaks in the impulse response as provided by the components of the estimated weight vector W(k).

The peak locator 510 determines the peaks of as the maximum values of the weights within a search region. Typically L peaks are located where L is a positive integer from 1 to 5. In one embodiment, L is equal to 5. The L peaks are located within a predetermined distance from one another. The peak locator 510 includes a squared magnitude calculator 515 to calculate the squared magnitude of the elements of the estimated channel weight vector in determining the value of the peaks. First, the highest peak is determined as the highest value of the weights in the channel weight vector W(k). Then, the second highest peak is located outside the region covering the highest peak. This region includes L1 samples on either side of the highest peak. In one embodiment, L1=25. Then, the third highest peak is located outside the region covering the second highest peak. This region includes L2 samples on either side of the second highest peak. In one embodiment, L2=25. The process continues until L peaks have been located.

The peak eliminator 520 eliminates a false peak in the L peaks located by the peak locator 510. The false peak is identified when its value is less than a threshold value. In one embodiment, this threshold value is equal to $\beta$*highest peak value where $\beta$ is a number between 0.4 to 0.8. In one embodiment, $\beta$=0.6. After al the false peaks are eliminated, the remaining peaks provide the delays, or the positions of the peaks.

Figure 6:
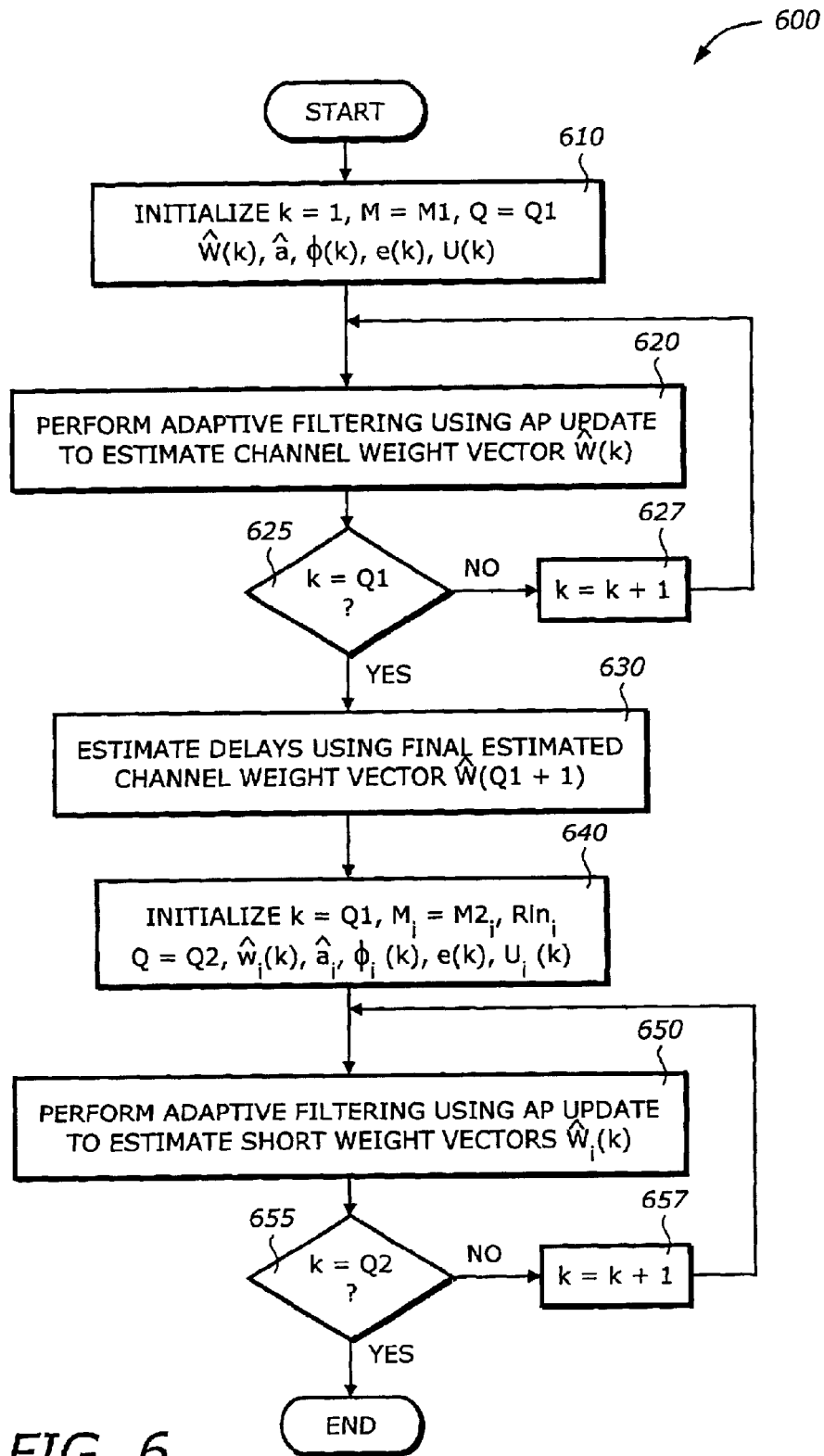
FIG. 6 is a flowchart illustrating a process for echo cancellation according to one embodiment of the invention.

FIG. 6 is a flowchart illustrating a process 600 for echo cancellation according to one embodiment of the invention.

Upon START, the process 600 initializes the loop interation index k=1, the filter length M=M1, the number of iterations Q=Q1, the channel weight vector W(k), the AR coefficient vector a, the random sequence $\phi$(k), the error e(k), and the past receive input sequence U(k) (Block 610). In one embodiment, M1 is equal to 256, 512, or 1024. Next, the process 600 performs adaptive filtering using the AP update to estimate the channel weight vector W(k) (Block 620). Then, the process 600 determines if the iteration index k is equal to Q1 (Block 625). If not, the process 600 increments the iteration index k (Block 627) and goes back to Block 620. Otherwise, the process 600 estimates the delays using the final estimated channel weight vector $\hat{W}$(k)=$\hat{W}$(Q1+1) (Block 630).

Next, the process 600 initializes iteration index k=Q1, the filter length M=M2, the number of iterations Q=Q2, the parameters w(k), a(k), $\phi$(k), e(k), U(k), and partial input sequences Rin for each partial adaptive filters (Block 640). M2 may be the same as M1 or less than M1. In one embodiment where M1=1024, M2=60 to 100. Then, the process 600 performs the adaptive filtering using the AP update to estimate the short weight vectors $\hat{W}_i$(k) (Block 650). The calculations and updating in Block 650 are essentially the same as those in Block 620. In this way, the same filter implementation can be used in both stages. Alternatively, two separate adaptive filters may be implemented.

Then, the process 600 determines if the iteration index is equal to Q2 (Block 655). If not, the process 600 increments the iteration index k (Block 657) and goes back to Block 650. Otherwise, the process 600 is terminated.

Figure 7:
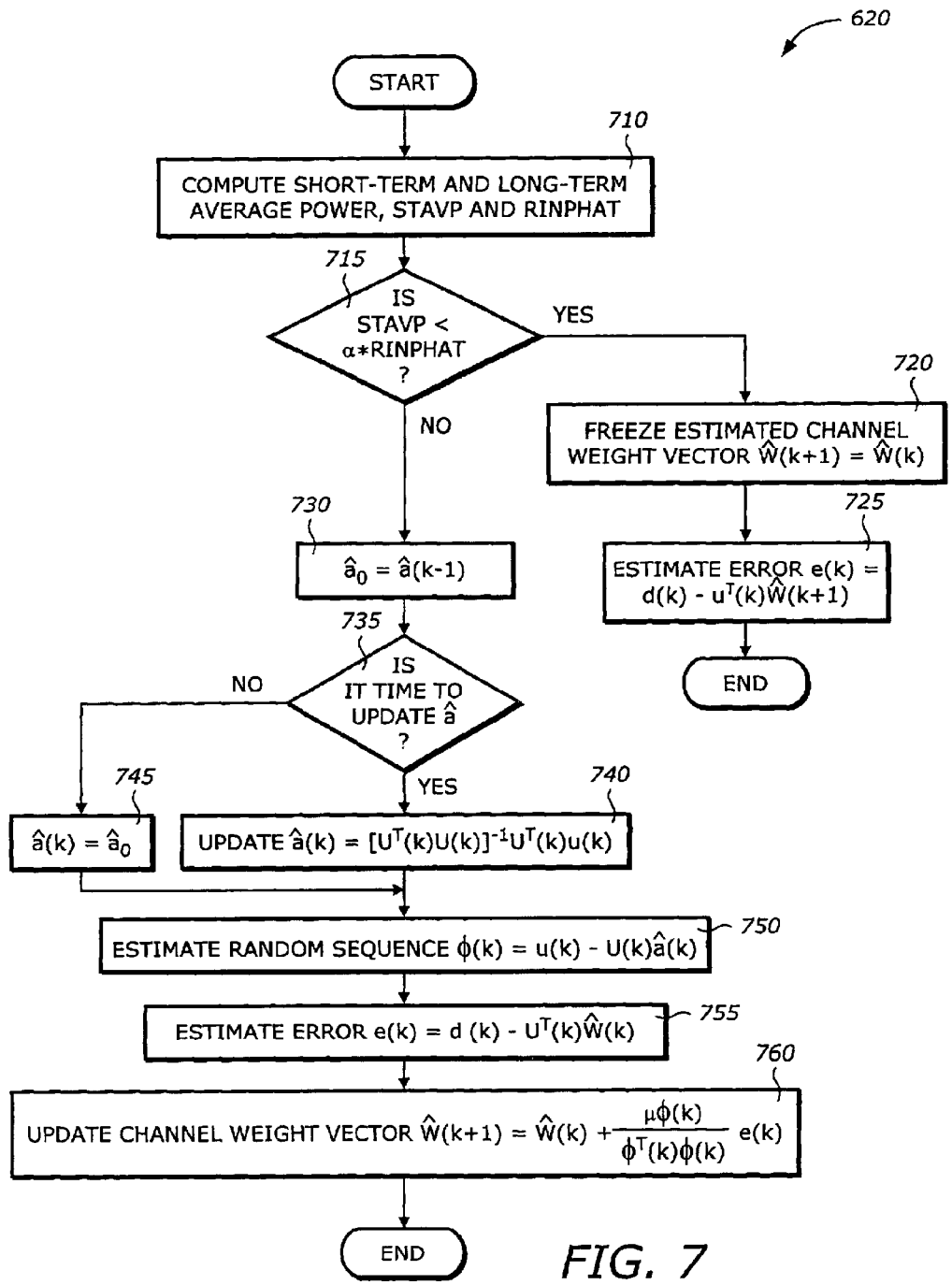
FIG. 7 is a flowchart illustrating a process for adaptive filtering using AP update shown in FIG. 6 according to one embodiment of the invention.

FIG. 7 is a flowchart illustrating a process 620 for adaptive filtering using AP update shown in FIG. 6 according to one embodiment of the invention.

Upon START, the process 620 computes the short term average power, stavp, and the long-term average power, Rinphat (Block 710). Then, the process 620 determines if stavp is less than Rinphat by a predetermined amount (Block 715). In one embodiment, this amount is 20 dB. If so, the process 620 freezes the estimated channel weight vector (Block 720) and estimates the error e(k) as given by equation (9) (Block 725) and is then terminated. Otherwise, the process 620 saves the estimated AR coefficient vector a(k−1) (Block 730).

Next, the process 620 determines if it is time to update the AR coefficient vector a (Block 735). In one embodiment, this first update rate corresponds to every R iterations where R=100. If it is not time to update, the estimated AR coefficient vector is kept the same as the previous value saved in Block 730 (Block 745). Otherwise, the AR coefficient vector a is updated according to equation (7) (Block 740). Next, the process 620 estimates the random sequence $\phi$(k) using equation (8) (Block 750). Then, the process 620 estimates the error e(k) using equation (9) (Block 755). Next, the process 620 updates the channel weight vector $\hat{W}$(k) using equation (10) (Block 760) and is then terminated.

Figure 8:
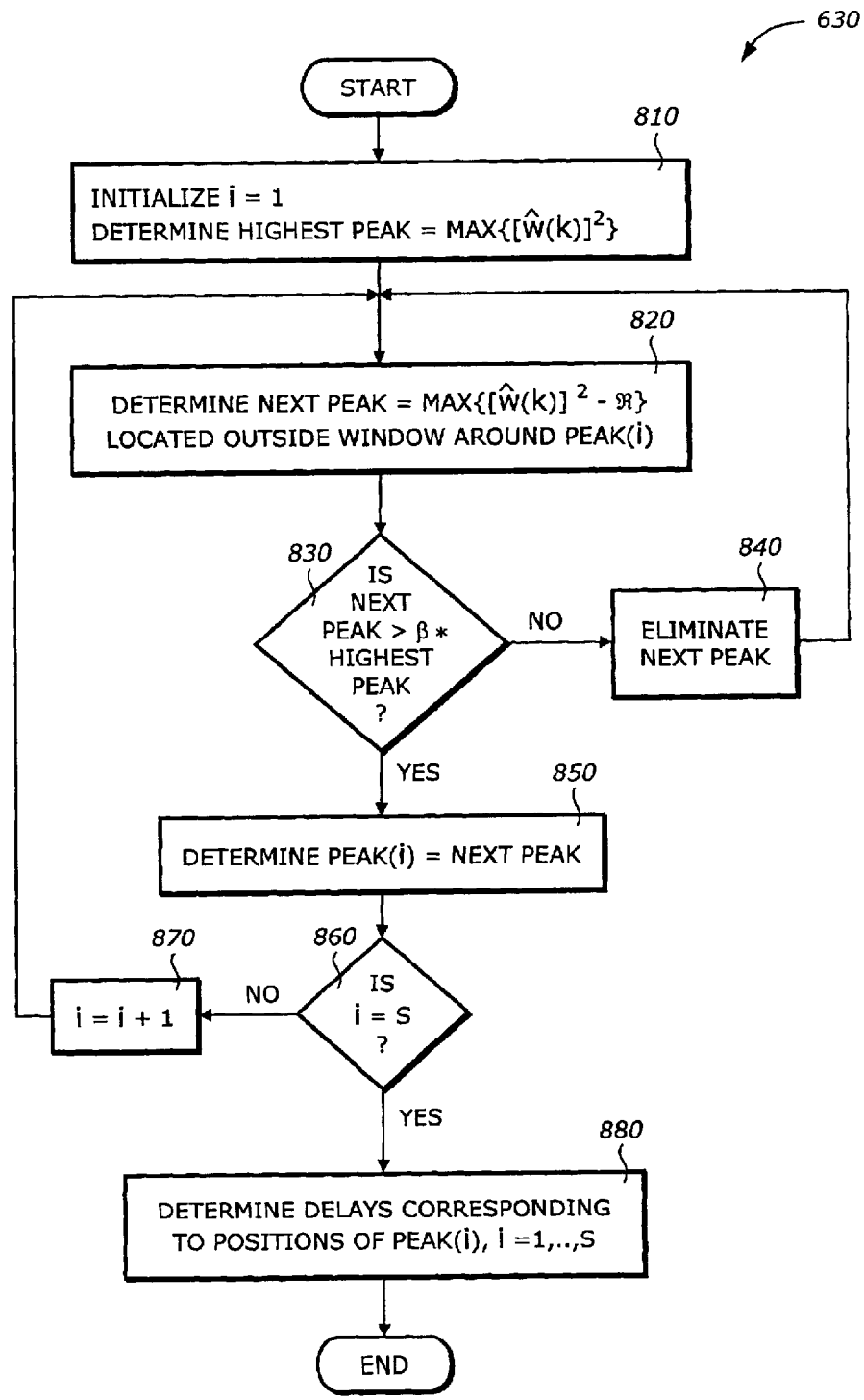
FIG. 8 is a flowchart illustrating a process for delay estimation shown in FIG. 6 according to one embodiment of the invention.

FIG. 8 is a flowchart illustrating a process 630 for delay estimation shown in FIG. 6 according to one embodiment of the invention.

Upon START, the process 630 initializes the peak index i=1 and determines the highest peak, peak(k)=max {$\hat{W}$(k)} where $\hat{W}$(k) is the channel weight vector provided by the adaptive filter (Block 810). In determining the highest peak, the squared magnitude of the estimated channel weight vector is used. Next, the process 630 determines the next peak located outside the window around peak(k), next_peak=max {$\hat{W}$(k)−R} where R is the region surrounding peak(i), the most recent located peak (Block 820). In one embodiment, R covers 25 samples on either of peak(i) for a total of 51 samples. Then, the process 630 determines if next_peak is greater than $\beta$*highest peak (Block 830). In one embodiment, $\beta$ is equal to 0.6. If next_peak is not greater than $\beta$*highest peak, next_peak is assumed to be a false peak and is eliminated (Block 840). Otherwise, the process 630 determines the peak(i) to be next_peak (Block 850). Then, the process 630 determines if the number of peaks located so far is equal to S where S is the total number of peaks to be located (Block 860). In one embodiment, S is equal to 3 to 5. If not, the process 630 increments the peak index i=i+1 (Block 870), and then goes back to Block 820. Otherwise, the process 630 determines the delays corresponding to the positions of the peak(i) where i=1, . . . , S (Block 880). The process 630 is then terminated.

Figure 9:
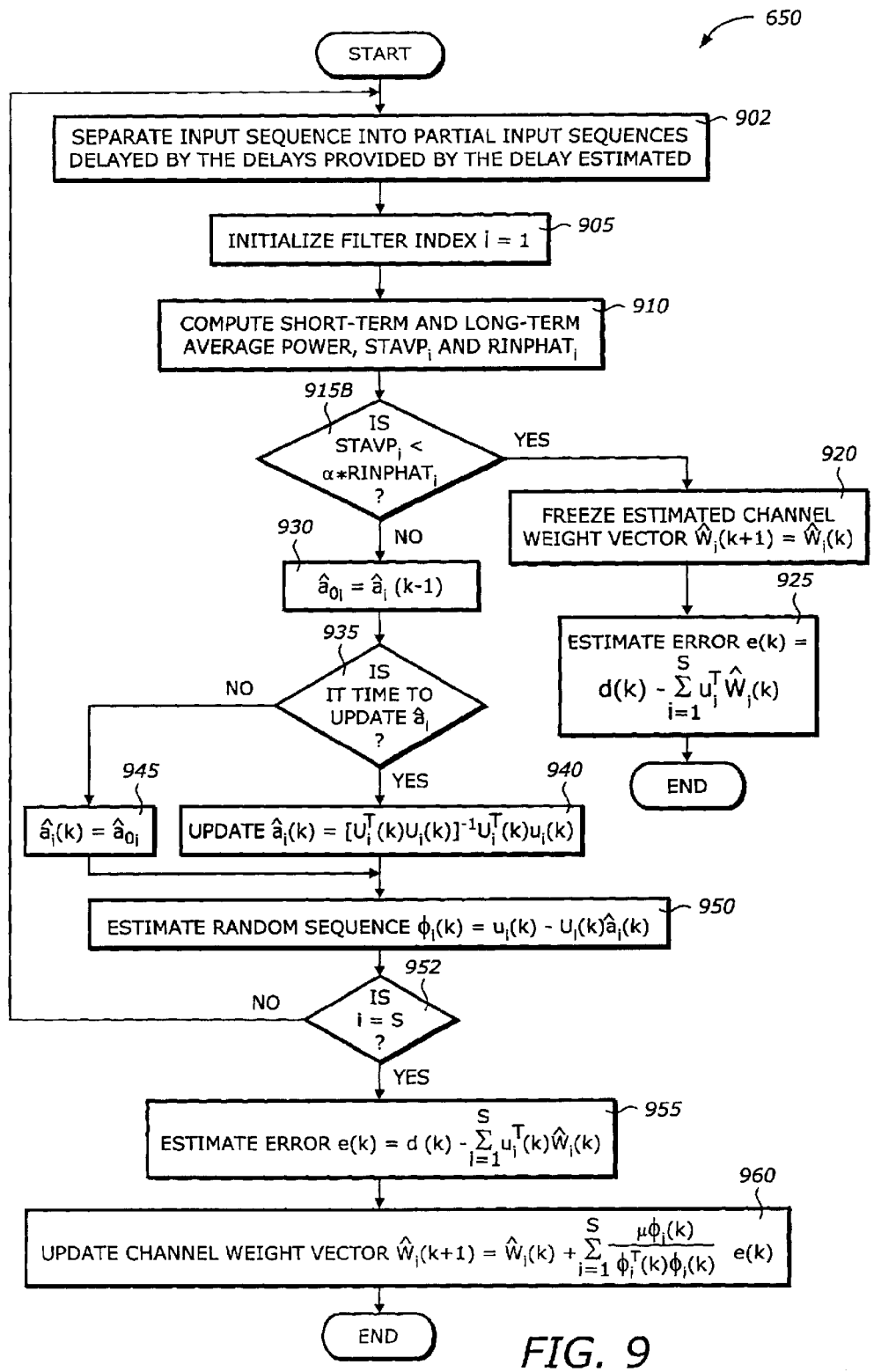
FIG. 9 is a flowchart illustrating a process for partial adaptive filtering using AP update according to one embodiment of the invention.

FIG. 9 is a flowchart illustrating the process 650 for partial adaptive filtering using AP update according to one embodiment of the invention.

Upon START, the process 650 separates the receive input sequence into a plurality of partial input sequences (Block 902). Each of the partial input sequences is delayed by one of the delays provided by the delay estimator. Each partial input sequence is represented by a sum of a partial random sequence and a past partial input sequence weighted by a partial AR coefficient vector. Next, the process 650 initializes the filter index (Block 905) to be used in a loop for S partial adaptive filter elements. It is noted that although the flowchart shows a sequential operations of the partial adaptive filters, these operations may be performed sequentially or in parallel.

Then, the process 650 computes the short term average power, stavp$_i$, and the long-term average power, Rinphat$_i$, associated with the partial input sequence (Block 910). Then, the process 650 determines if stavp is less than Rinphat by a predetermined amount (Block 915). In one embodiment, this amount is 20 dB. If so, the process 650 freezes the estimated channel weight vector (Block 920) and estimates the error e(k) as given by equation (14) (Block 925) and is then terminated. Otherwise, the process 650 saves the estimated AR coefficient vector â(k−1) (Block 930).

Next, the process 650 determines if it is time to update the partial AR coefficient vector a (Block 935). In one embodiment, this first update rate corresponds to every R iterations where R=100. If it is not time to update, the estimated partial AR coefficient vector is kept the same as the previous value saved in Block 930 (Block 945). Otherwise, the partial AR coefficient vector a is updated according to equation (12) (Block 940). Next, the process 650 estimates the random sequence φ(k) using equation (13) (Block 950). Then, the process 650 determines if the filter index i is equal to S (Block 952). If not, the process 650 increments the filter index to go to the next partial filtering (Block 953) and returns to block 910. Otherwise, the process 650 estimates the error e(k) using equation (9) (Block 955). Next, the process 650 updates the channel weight vector Ŵ(k) using equation (10) (Block 960) and is then terminated.

The echo cancellation using the AP update with partial adaptive filters converges faster than the NLMS technique for sparse multi-path channels. The AP-based echo cancellation can be implemented in various ways. In one embodiment, the length M1 of the adaptive filter 310 (i.e., the size of the channel weight vector) is 1024 and the length M2 of elements of the adaptive filter 330 ranges from 60 to 100 depending on the characteristics of the multi paths. It is noted that each of the sub-filters of the adaptive filter 330 may have same or different lengths. The echo canceller 125 may be implemented by hardware or software or a combination of both. In addition, the adaptive filters 310 and 330 may be implemented as a single adaptive filter or separate filters.

The results of the AP(2) technique for echo cancellation are shown in FIGS. 10A, 10B, 10C, 11A, 11B, and 11C. The standard AP(2) method was tested with data files used for G.168 test 2b (Rin and Sin).

Figure 10A:
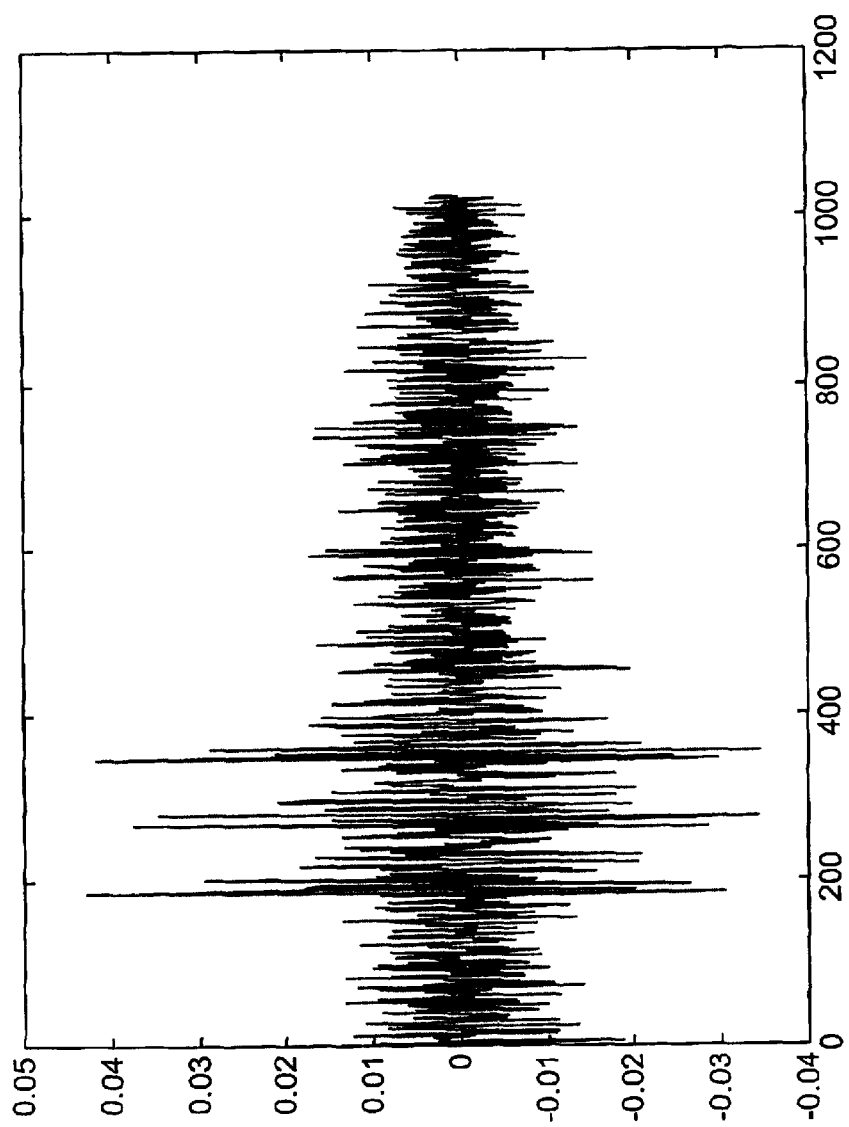
FIG. 10A is a diagram illustrating weights for non-sparse channels after the first adaptation phase according to one embodiment of the invention.

FIG. 10A is a diagram illustrating weights for non-sparse channels after the first adaptation phase according to one embodiment of the invention.

Figure 10B:
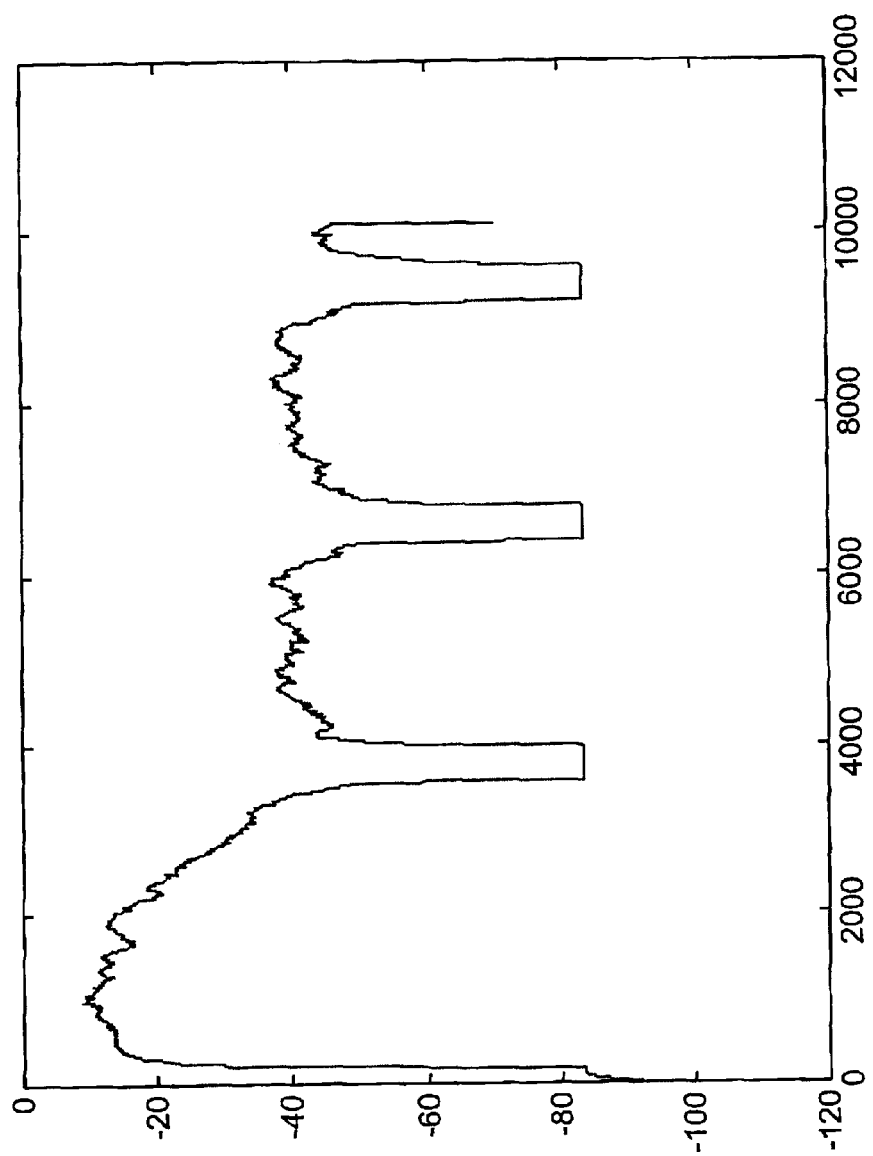
FIG. 10B is a diagram illustrating the mean square error (MSE) for non-sparse channels for the first 10,000 learning samples according to one embodiment of the invention.

FIG. 10B is a diagram illustrating the mean square error (MSE) for non-sparse channels for the first 10,000 learning samples according to one embodiment of the invention.

Figure 10C:
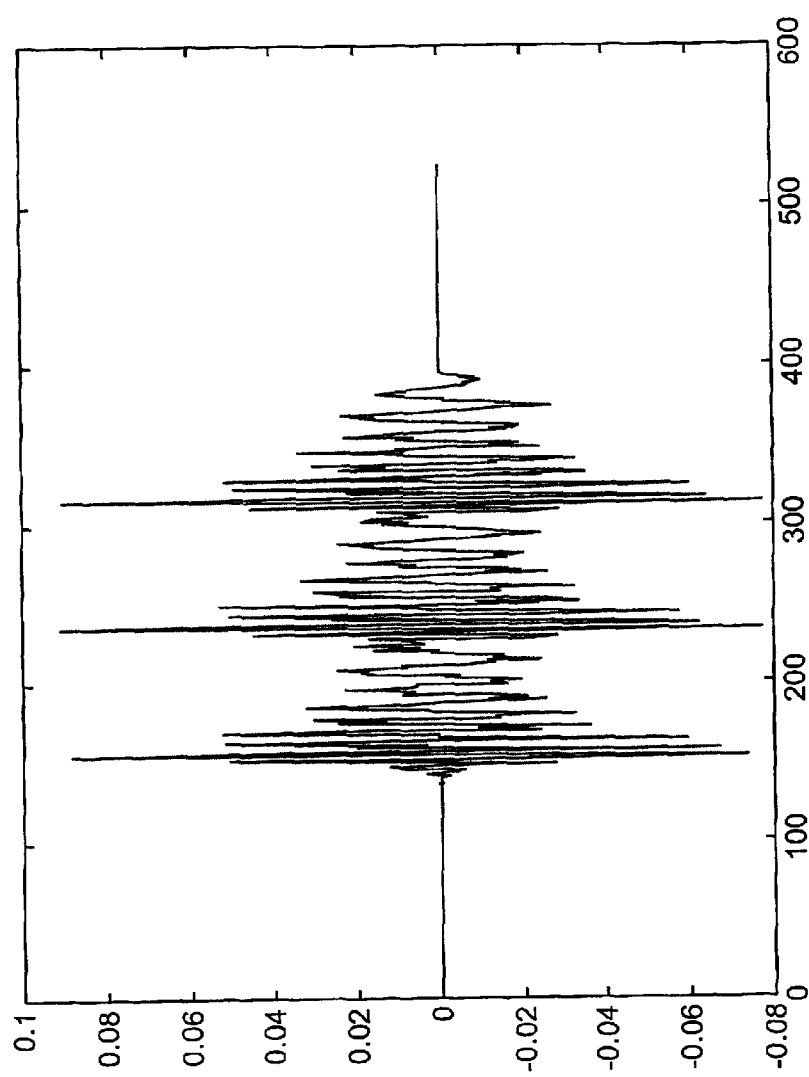
FIG. 10C is a diagram illustrating estimate of the channel impulse response for non-sparse channels after 10,000 samples according to one embodiment of the invention.

FIG. 10C is a diagram illustrating estimate of the channel impulse response for non-sparse channels after 10,000 samples according to one embodiment of the invention.

Figure 11A:
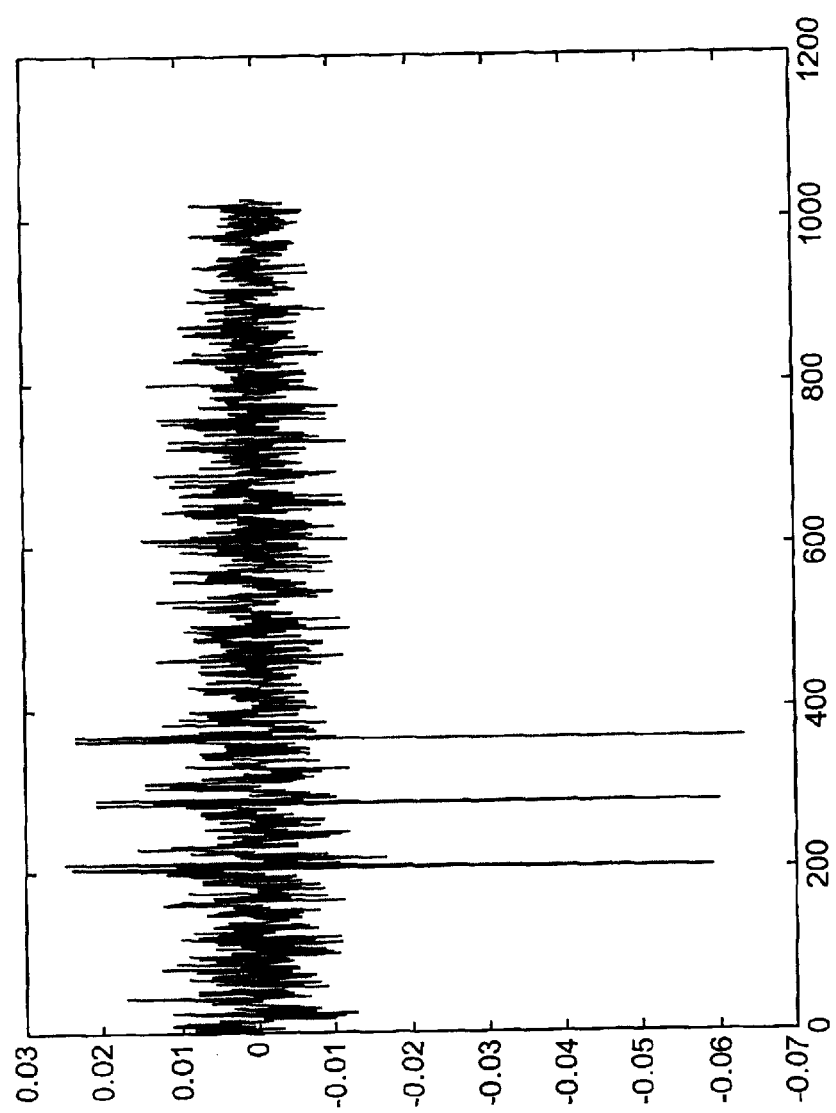
FIG. 11A is a diagram illustrating weights for sparse channels after the first adaptation phase according to one embodiment of the invention.

FIG. 11A is a diagram illustrating weights for sparse channels after the first adaptation phase according to one embodiment of the invention.

Figure 11B:
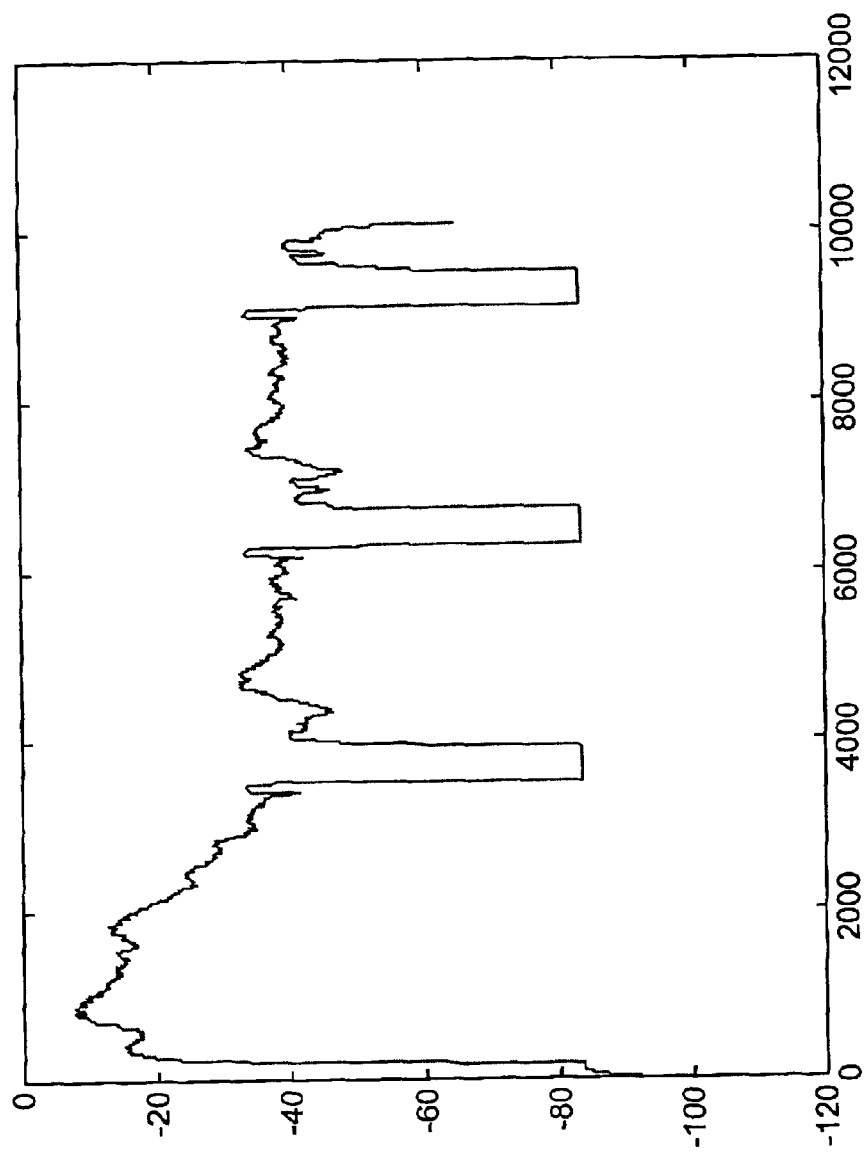
FIG. 11B is a diagram illustrating the mean square error (MSE) for sparse channels for the first 10,000 learning samples according to one embodiment of the invention.

FIG. 11B is a diagram illustrating the mean square error (MSE) for sparse channels for the first 10,000 learning samples according to one embodiment of the invention.

Figure 11C:
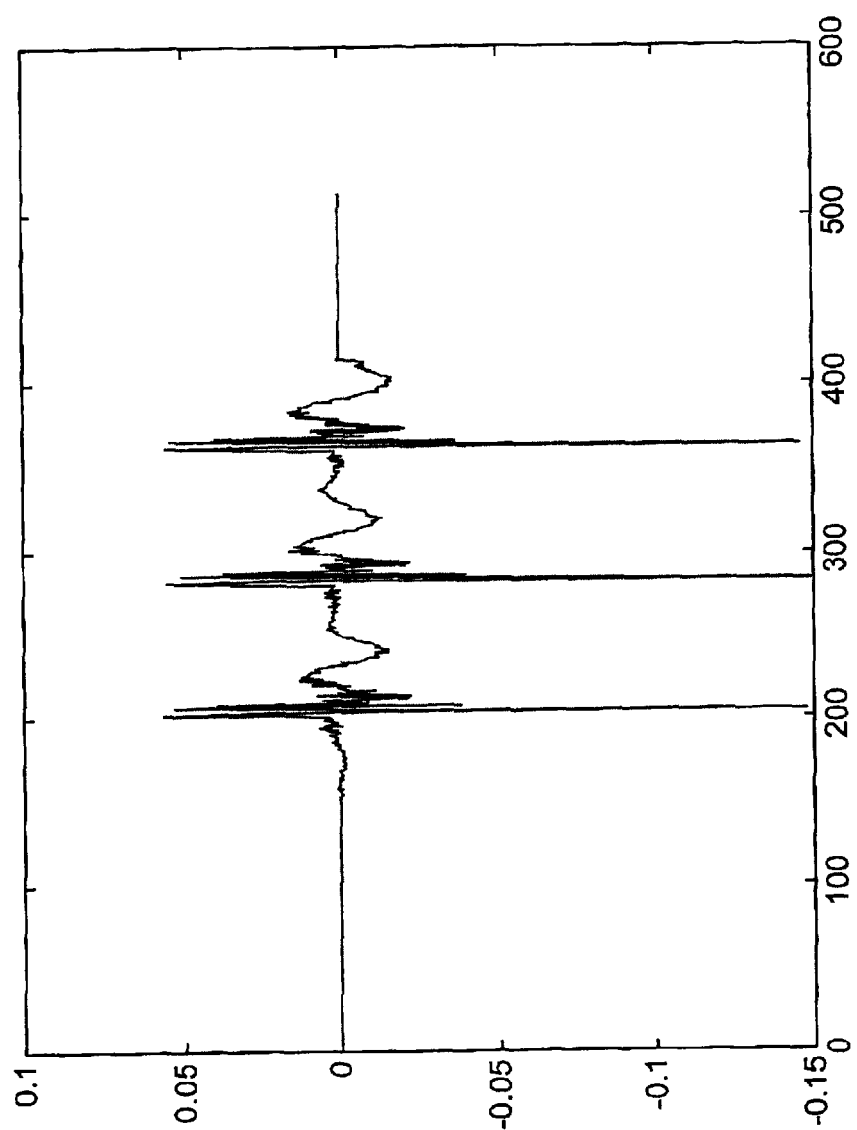
FIG. 11C is a diagram illustrating estimate of the channel impulse response for non-sparse channels after 10,000 samples according to one embodiment of the invention.

FIG. 11C is a diagram illustrating estimate of the channel impulse response for non-sparse channels after 10,000 samples according to one embodiment of the invention.

While this invention has been described with reference to illustrative embodiments, this description is not intended to be construed in a limiting sense. Various modifications of the illustrative embodiments, as well as other embodiments of the invention, may be deemed to lie within the spirit and scope of the invention.

What is claimed is:

1. An apparatus comprising:
   a first adaptive filter having a first length to estimate a channel weight vector of an echo channel using an affine projection (AP) update, the echo channel receiving a send input sequence and a receive input sequence, the echo channel having a plurality of sparse multi-path channels;
   a delay estimator coupled to the adaptive filter to determine a plurality of delays in the echo channel using the estimated channel weight vector; and
   a second adaptive filter coupled to the delay estimator to estimate a plurality of short weight vectors using the AP update and the plurality of delays, the short weight vectors corresponding to the sparse multi-path channels, each of the short weight vectors having a second length shorter than the first length.

2. The apparatus of claim 1 wherein the receive input sequence is represented by a sum of a random sequence and a past receive input sequence weighted by an auto-regressive (AR) coefficient vector.

3. The apparatus of claim 2 wherein the first adaptive filter comprises:
   an AR coefficient estimator to estimate the AR coefficient vector at a first update rate using the past receive input sequence and the receive input sequence;
   a random estimator coupled to the AR coefficient estimator to estimate the random sequence at a second update rate using the estimated AR coefficient vector;
   an error estimator to estimate an error at the second update rate using the send input sequence, the receive input sequence, and the estimated channel weight vector; and
   a weight updater coupled to the error estimator and the random estimator to update the channel weight vector at the second update rate using the estimated error and the estimated random sequence.

4. The apparatus of claim 1 wherein the delay estimator comprises:
   a peak locator to locate positions of peaks of an impulse response of the echo channel using the estimated channel weight vector, the positions corresponding to the delays; and
   a peak eliminator to eliminate a false peak in the peaks.

5. The apparatus of claim 1 wherein the second adaptive filter comprises:
   an input separator to separate the receive input sequence into a plurality of partial input sequences, each of the partial input sequences being delayed by one of the delays provided by the delay estimator and being represented by a sum of a partial random sequence and a past partial input sequence weighted by a partial auto-regressive (AR) coefficient vector;

a plurality of partial AR coefficient estimators coupled to the input separator, each of the partial AR coefficient estimators estimating the partial AR coefficient vector at a first update rate using the past partial input sequence and the partial input sequence;

a plurality of partial random estimators coupled to the partial AR coefficient estimators, each of the partial random estimators estimating the partial random sequence at a second update rate using the estimated partial AR coefficient vector;

an error estimator to estimate an error at the second update rate using the send input sequence, the partial input sequences, and the estimated short weight vectors; and a weight updater coupled to the error estimator and the random estimators to update the short weight vectors at the second update rate using the estimated error and the estimated partial random sequences.

6. The apparatus of claim 3 wherein the first update rate is slower than the second update rate.

7. The apparatus of claim 5 wherein the first update rate is slower than the second update rate.

8. The apparatus of claim 5 further comprising:
a plurality of partial short-term power calculators to calculate partial short-term average powers associated with the partial input sequences; and
a plurality of long-term partial power calculators to calculate partial long-term average powers associated with the partial input sequences.

9. The apparatus of claim 8 wherein the weight updater freezes the short weight vectors when the associated partial short-term average power is less than the associated partial long-term average power by a threshold power amount.

10. A method comprising:
Estimating a channel weight vector of an echo channel by a first adaptive filter using affine projection (AP) update, the echo channel receiving a send input sequence and a receive input sequence, the echo channel having a plurality of sparse multi-path channels;
determining a plurality of delays in the echo channel by a delay estimator using the estimated channel weight vector; and
estimating a plurality of short weight vectors by a second adaptive filter using the AP update and the plurality of delays, the short weight vectors corresponding to the sparse multi-path channels, each of the short weight vectors having a second length shorter than the first length.

11. The method of claim 10 wherein the receive input sequence is represented by a sum of a random sequence and a past receive input sequence weighted by an auto-regressive (AR) coefficient vector.

12. The method of claim 10 wherein estimating a channel weight vector of an echo channel by a first adaptive filter comprises:
estimating the AR coefficient vector by an AR coefficient estimator at a first update rate using the past receive input sequence and the receive input sequence;
estimating the random sequence at a second update rate by a random estimator coupled to the AR coefficient estimator using the estimated AR coefficient vector;
estimating an error at the second update rate by an error estimator using the send input sequence, the receive input sequence, and the estimated channel weight vector; and updating the channel weight vector at the second update rate by a weight updater coupled to the error estimator and random estimator using the estimated error and the estimated random sequence.

13. The method of claim 10 wherein determining the plurality of delays comprises:
locating positions of peaks of an impulse response of the echo channel by a peak locator using the estimated channel weight vector, the positions corresponding to the delays; and
eliminating a false peak in the peaks by a peak eliminator.

14. The method of claim 10 wherein estimating the channel weight vector comprises:
separating the receive input sequence into a plurality of partial input sequences by an input separator, each of the partial input sequences being delayed by one of the delays provided by the delay estimator and being represented by a sum of a partial random sequence and a past partial input sequence weighted by a partial auto-regressive (AR) coefficient vector;
estimating the partial AR coefficient vector at a first update rate using the past partial input sequence and the partial input sequence;
estimating the partial random sequence at a second update rate using the estimated partial AR coefficient vector
estimating an error at the second update rate by an error estimator using the send input sequence, the partial input sequences, and the estimated short weight vectors; and
updating the short weight vectors at the second update rate using the estimated error and the estimated partial random sequences.

15. The method of claim 12 wherein the first update rate is slower than the second update rate.

16. The method of claim 14 wherein the first update rate is slower than the second update rate.

17. The method of claim 14 further comprising:
calculating partial short-term average powers associated with the partial input sequences by a plurality of partial short-term power calculators; and
calculating partial long-term average powers associated with the partial input sequences by a plurality of long-term partial power calculators.

18. The method of claim 17 wherein updating the channel weight vector comprises freezing the short weight vector when the associated partial short-term average power is less than the associated partial long-term average power by a threshold power amount.

19. A system comprising:
a first decoder coupled to a far end of an acoustic channel to decode a far end signal, the first decoder generating a receive input sequence;
a second decoder coupled to a near end of the acoustic channel to decode a near end signal, the second decoder generating a send input sequence; and
an echo canceller in an echo channel coupled to the first and second decoders to perform echo cancellation, the echo channel receiving the receive and send input sequences, the echo canceller comprising:
a first adaptive filter having a first length to estimate a channel weight vector of an echo channel using an affine projection (AP) update, the echo channel receiving a send input sequence and a receive input sequence, the echo channel having a plurality of sparse multi-path channels, a delay estimator coupled to the adaptive filter to determine a plurality of delays in the echo channel using the estimated channel weight vector, and a second adaptive filter coupled to the delay estimator to estimate a plurality of short weight vectors using the AP update and the plurality of delays, the short weight vectors corresponding to the sparse multipath channels, each of the short weight vectors having a second length shorter than the first length.

20. The system of claim 19 wherein the receive input sequence is represented by a sum of a random sequence and a past receive input sequence weighted by an auto-regressive (AR) coefficient vector.

21. The system of claim 19 wherein the first adaptive filter comprises: an AR coefficient estimator to estimate the AR coefficient vector at a first update rate using the past receive input sequence and the receive input sequence;

a random estimator coupled to the AR coefficient estimator to estimate the random sequence at a second update rate using the estimated AR coefficient vector;

an error estimator to estimate an error at the second update rate using the send input sequence, the receive input sequence, and the estimated channel weight vector; and a weight updater coupled to the error estimator and the random estimator to update the channel weight vector at the second update rate using the estimated error and the estimated random sequence.

22. The system of claim 19 wherein the delay estimator comprises:

a peak locator to locate positions of peaks of an impulse response of the echo channel using the estimated channel weight vector, the positions corresponding to the delays; and a peak eliminator to eliminate a false peak in the peaks.

23. The system of claim 19 wherein the second adaptive filter comprises:

an input separator to separate the receive input sequence into a plurality of partial input sequences, each of the partial input sequences being delayed by one of the delays provided by the delay estimator and being represented by a sum of a partial random sequence and a past partial input sequence weighted by a partial auto-regressive (AR) coefficient vector;

a plurality of partial AR coefficient estimators coupled to the input separator, each of the partial AR coefficient estimators estimating the partial AR coefficient vector at a first update rate using the past partial input sequence and the partial input sequence;

a plurality of partial random estimators coupled to the partial AR coefficient estimators, each of the partial random estimators estimating the partial random sequence at a second update rate using the estimated partial AR coefficient vector;

an error estimator to estimate an error at the second update rate using the send input sequence, the partial input sequences, and the estimated short weight vectors; and a weight updater coupled to the error estimator and the random estimators to update the short weight vectors at the second update rate using the estimated error and the estimated partial random sequences.

24. The system of claim 21 wherein the first update rate is slower than the second update rate.

25. The system of claim 23 wherein the first update rate is slower than the second update rate.

26. The system of claim 23 further comprising:

a plurality of partial short-term power calculators to calculate partial short-term average powers associated with the partial input sequences; and a plurality of long-term partial power calculators to calculate partial long-term average powers associated with the partial input sequences.

27. The apparatus of claim 26 wherein the weight updater freezes the short weight vector when the associated partial short-term average power is less than the associated partial long-term average power by a threshold power amount.

28. A computer program product comprising: a machine useable medium having program code embedded therein, the program code comprising:

computer readable program code to estimate a channel weight vector of an echo channel by a first adaptive filter using an affine projection (AP) update, the echo channel receiving a send input sequence and a receive input sequence, the echo channel having a plurality of sparse multi-path channels;

computer readable program code to determine a plurality of delays in the echo channel by a delay estimator using the estimated channel weight vector; and computer readable program code to estimate a plurality of short weight vectors by a second adaptive filter using the AP update and the plurality of delays, the short weight vectors corresponding to the sparse multi-path channels, each of the short weight vectors having a second length shorter than the first length.

29. The computer program product of claim 28 wherein the receive input sequence is represented by a sum of a random sequence and a past receive input sequence weighted by an auto-regressive (AR) coefficient vector.

30. The computer program product of claim 28 wherein the computer readable program code to estimate the channel weight vector comprises:

computer readable program code to estimate the AR coefficient vector at a first update rate using the past receive input sequence and the receive input sequence;

computer readable program code to estimate the random sequence at a second update rate using the estimated AR coefficient vector;

computer readable program code to estimate an error at the second update rate using the send input sequence, the receive input sequence, and the estimated channel weight vector; and computer readable program code to update the channel weight vector at the second update rate using the estimated error and the estimated random sequence.

31. The computer program product of claim 28 wherein the computer readable program code to determine the plurality of delays comprises:

computer readable program code to locate positions of peaks of an impulse response of the echo channel using the estimated channel weight vector, the positions corresponding to the delays; and computer readable program code to eliminate a false peak in the peaks.

32. The computer program product of claim 28 wherein the computer readable program code to estimate the plurality of short weight vectors comprises:

computer readable program code to separate the receive input sequence into a plurality of partial input sequences, each of the partial input sequences being delayed by one of the delays and being represented by a sum of a partial random sequence and a past partial input sequence weighted by a partial auto-regressive (AR) coefficient vector;

computer readable program code to estimate the partial AR coefficient vector at a first update rate using the past partial input sequence and the partial input sequence, computer readable program code to estimate the partial random sequence at a second update rate using the estimated partial AR coefficient vector, computer readable program code to estimate an error at the second update rate by an error estimator using the send input sequence, the partial input sequences, and the estimated short weight vectors; and computer readable program code to update the short weight vectors at the second update rate by a weight updater coupled to the error estimator and the random estimators using the estimated error and the estimated partial random sequences.

33. The computer program product of claim 30 wherein the first update rate is slower than the second update rate.

34. The computer program product of claim 32 wherein the first update rate is slower than the second update rate.

35. The computer program product of claim 32 further comprising:

computer readable program code to calculate partial short-term average powers associated with the partial input sequences; and computer readable program code to calculate partial long-term average powers associated with the partial input sequences.

36. The computer program product of claim 35 wherein the computer readable program code to update the short weight vectors comprises computer readable program code to freeze the short weight vector when the associated partial short-term average power is less than the associated partial long-term average power by a threshold power amount.

* * * * *